United States Patent

[11] 3,569,893

[72] Inventor Lawrence L. Pembrook
 Norwalk, Ohio
[21] Appl. No. 815,862
[22] Filed Apr. 14, 1969
[45] Patented Mar. 9, 1971
[73] Assignee Norwalk Thermostat Company
 Norwalk, Ohio

[54] POSITIVE RUN THERMOSTAT
 10 Claims, 3 Drawing Figs.
[52] U.S. Cl. .................................................. 337/361,
 337/347, 337/372
[51] Int. Cl. .................................................. H01h 37/20,
 H01h 37/52
[50] Field of Search .......................................... 337/94,
 111, 333, 334, 347, 348, 349, 360, 361, 368, 372,
 379; 200/153.11, 33.2 (Cursory)

[56] References Cited
 UNITED STATES PATENTS
 3,389,361 6/1968 Manecke ..................... 337/347
 2,833,893 5/1958 Weber ........................ 337/372(X)
 2,473,081 6/1949 Vaughan ...................... 337/360
 FOREIGN PATENTS
 324,023 1/1930 Great Britain ................ 337/361

OTHER REFERENCES
 W. German Printed Application DAS 1128012/April 1962/A. Dorries/337—379

Primary Examiner—Bernard A. Gilheany
Assistant Examiner—Dewitt M. Morgan
Attorney—Wilson & Fraser ABSTRACT: An adjustable thermostat having a thermally flexed actuating element which is adjustably positioned toward and away from an actuating position and can be displaced to the actuating position for a wide range of temperatures by means of an element which drives the actuating element. The driving element is activated by the setting of the adjustment means to a predetermined state to set the thermally flexed element to its "on" position independent of temperature. A positive run thermostat having a bimetallic blade as an actuator for a snap action switch assembly. The blade is mounted as a beam maintained against two longitudinally spaced, opposed abutments and arranged for adjustment by adjustment of the relative positions of the abutments normal to the major face of the blade. A screw adjustment means for one of the abutments is combined with an actuating finger which engages a plunger at the full "on" or positive run position to cause the plunger to engage the bimetallic blade and displace it to its switch actuating condition for all temperatures to which the thermostat is subjected.

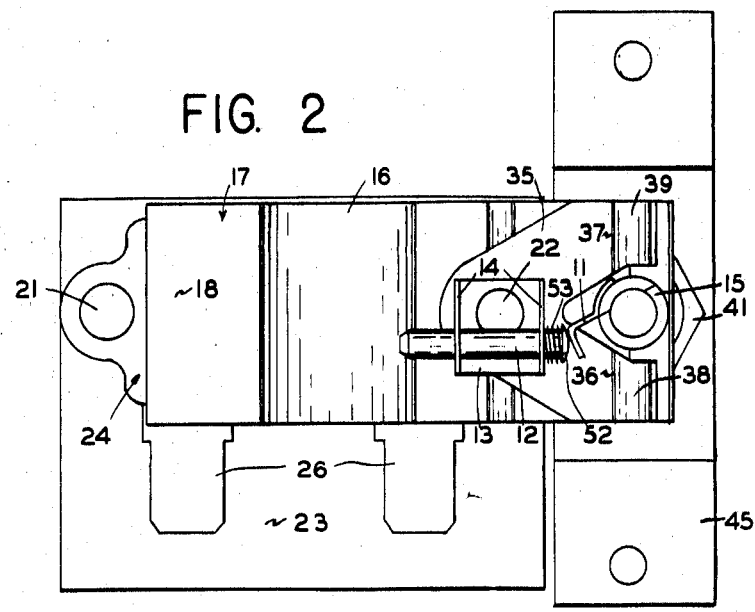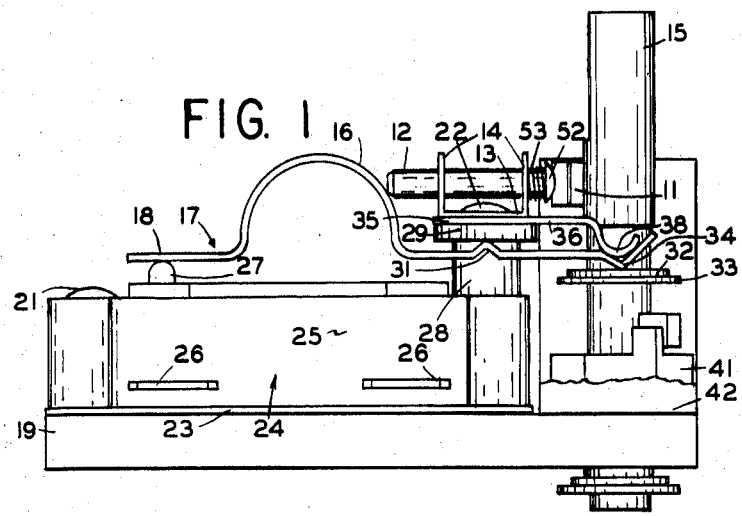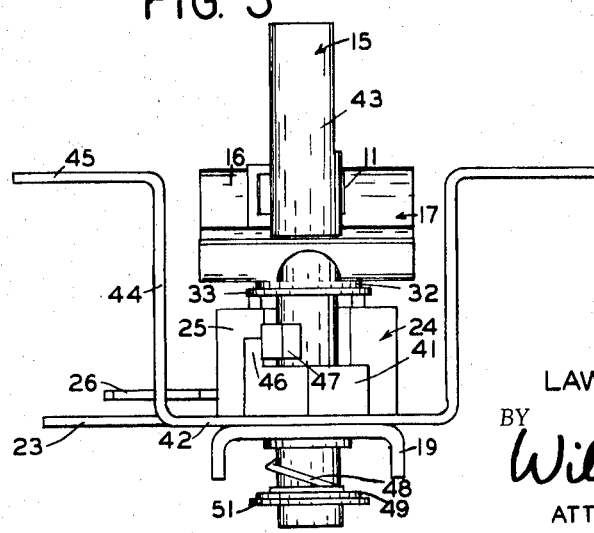

POSITIVE RUN THERMOSTAT

CROSS-REFERENCE TO RELATED PATENTS

This invention in its specific disclosure below is applied to a thermostat of the type shown in the copending U.S. Pat. application Ser. No. 815,863 of Dale H. Callihan entitled "Bimetallic Strip Thermostat" Filed Apr. 14, 1969.

BACKGROUND OF THE INVENTION

This invention relates to adjustable thermostats and more particularly to means for adjusting thermostats to a full on setting for all temperatures to which they are normally subjected.

Heretofore it has been known to arrange thermostats of the type which actuate electrical switches to an on condition for all temperatures utilizing a cam which is mounted on the adjusting stem of shaft of the thermostat to engage the face of the thermally responsive element, a bimetal blade, in a plane normal to the stem. Such cams can be utilized only with relatively complex assembly and calibration procedures. They normally are applicable to rear mounted units, that is units in which the stem protrudes from the side of the assembly opposite the bimetal blade. They require a substantial arc of the rotation of the stem to actuate the "positive on" condition, thereby substantially restricting the arc available for temperature settings.

SUMMARY OF THE INVENTION

The present invention relates to a stem mounted "positive on" control for a thermostat wherein a cam, which is advantageously a spring finger, actuates a portion of the thermally responsive flexure element of the thermostat at a region remote from the region for mounting the flexure element to displace the actuating portion of that element. Where the thermally responsive element is mounted to abut a pair of spaced abutments and is adjusted as to the temperature at which its actuating portion is displaced to a critical actuating position by relative movement of the abutments, the means for actuating the "positive on" state can lift the thermally responsive element free of one of the abutments in establishing the "positive on" condition and thereby avoid excessive stressing of the element in the region beyond its mounting means. In the disclosed embodiment the cam engages a pushrod or plunger to displace the actuating end of a bimetal strip to its fully actuated position. The spring finger and plunger lend themselves to application to front mounted thermostats and can be assembled with wide tolerances simply and expeditiously without requiring a large arc of rotation to actuate the "positive on" condition. In one embodiment the plunger is mounted in plane normal to the stem or adjusting shaft and is arranged to engage a side of a convex loop of the bimetal strip projecting out of the plane of the major body portion of the strip which also is normal to the stem.

An object of the invention is to improve "positive on" controls for adjustable thermostats.

Another object is to reduce the range of adjustment utilized in actuating a "positive on" control for an adjustable thermostat.

A third object is to provide a detent to maintain a "positive on" control actuated and prevent resetting thereof as by vibration.

DESCRIPTION OF THE DRAWINGS

FIG. 1 is an elevation with the mounting bracket broken away of a front mounted thermostat switch of the type disclosed in the aforenoted Callihan Pat. application to which a "positive on" control set in the "on" condition according to this invention is applied;

FIG. 2 is a plan of the assembly of FIG. 1; and

FIG. 3 is a right-hand end view of FIG. 1.

DESCRIPTION OF THE PREFERRED EMBODIMENT

The "positive on" feature of this invention is shown as a spring finger 11 engageable with a plunger 12 reciprocating in a bracket 13 having two upstanding lugs 14 apertured to slidingly receive the plunger. It functions in response to the rotation of adjusting shaft or stem 15 to a critical position whereby the plunger is forced against the convex loop 16 of the thermally responsive element, a bimetal strip 17, to displace the actuating portion 18 of strip 17 of its actuating position.

FIG. 1 shows an adjustable thermostatically controlled switch assembly including a base channel 19 on which is mounted as by rivets 21 and 22 an insulating panel 23 and a superposed control element such as snap action switch assembly 24 of the type disclosed in W. T. Watson Pat. No. 3,366,756 of Jan. 30, 1968 for "Snap Action Assembly". Switch assembly 24 includes an insulating housing 25, a pair of electrical terminals 26 protruding from the housing, an actuating plunger 27 extending from the top of the housing as viewed in FIG. 1 and biased upward (by means not shown) to open snap action switch contacts (not shown). Displacement of the plunger 27 toward the housing at a critical actuating position causes the snap action to close the contacts completing the circuit between terminals 26.

The thermally responsive element, bimetal strip 17, is mounted to operatively engage its actuating portion 18 with switch plunger 27 through its thermally induced flexure, downward as viewed in FIG. 1 with increased temperature, by a supporting and retaining mounting structure secured to base channel 19. Strip 17 is apertured to loosely encompass a flanged sleeve 28 on rivet 22. The head 29 of sleeve 28 provides an abutment on its lower surface upon which the upper convex surface of loop 31 in strip 17 bears. A second support for strip 17 is provided by the adjusting stem 15 as an abutment in the form of a washer 32 coaxially mounted on stem 15 against a snap washer 33 fitting into a circumferential groove (not shown) in the stem 15. The convex lower surface of downward extending loop 34 of strip 17 engages washer 32 on either side of stem 15. Strip 17 is apertured to receive stem 15 loosely.

The convex region 34 of bimetal strip 17 has a rolling engagement with washer abutment 32 as the abutment is moved normal to the major faces of the strip. It is maintained against the abutment to insure that it follows all positions of the abutment and to tend to sustain the strip without imposing mechanical stress at the actuating portion 18 by means of a resilient holddown 35 made up of a leaf spring secured upon the upper face of head 29 by rivet 22 and bracket 13 as a cantilever and bifurcated to straddle stem 15 by legs 36 and 37 terminating in the feet 38 and 39 engaging the concave portion of loop 34. Feet 38 and 39 are semicylindrical in form and of greater radius on their convex surface than the radius of the concave surface of loop 34 whereby two lines of contact are made by each foot with its registering strip loop portion.

Adjustment of the mounting position of strip 17 is by means of the adjustment of the height of abutment 32 from base 19. A screw coupling between shaft 15 and the base affords such adjustment in response to the rotation of the shaft whereby movement of abutment 32 away from base 19 moves actuating end 18 closer to base 19 and reduces the temperature at which flexure in the bimetal will actuate switch 25.

Stem 15 is secured to base 19 by its threaded engagement in collar 41 which has a reduced portion extending through and swaged within mounting bracket 42 and the web of the channel forming base 19. Bracket 42 and the knob support extension 43 of stem 15 are arranged for front mounting, that is the bimetallic strip 17 is adjacent the panel (not shown) to which the assembly is secured and through which the extension 43 projects to receive an adjusting knob (not shown). Bracket 42 has legs 44 extending parallel to the stem 15 and terminating in feet 45 which may be secured to the support panel.

A stop 46 is formed integral with the collar 41 to cooperate with a stud 47 protruding from stem 15 to establish the limits of rotation of stem 15. Stud 47 is secured to stem 15 during the calibration of the thermostat, as is well-known.

Backlash and inadvertent changes in the adjusted position of stem 15 are minimized by imposing tension along the axis of stem 15 and against the threaded coupling between the collar and stem. Helical spring 48 is maintained in compression between the underside of base 19 and a washer 49 mounted on stem 15 by means of a snap washer 51 fitted into a groove in the stem to provide the tensioning force.

In operation, rotation of stem 15 causes the displacement of abutment 32 toward or away from base 19 to tend to rock bimetal strip 17 around abutment 29, thereby shifting the actuating portion 18 of strip 17 to alter the temperature at which that portion makes the transition between its switch actuating position and its nonactuating position. In certain applications such as air conditioner controls it is desirable to be able to set a position at which the switch is continuously closed. This "positive on" setting is at the low end of the temperature adjustment range. As viewed in FIG. 2, the high temperature adjustment is established when stem 15 is at its counterclockwise limit. Rotation of stem 15 clockwise sets progressively lower temperature limits for opening the switch contacts. As the extreme of clockwise rotation is approached the rising face of finer 11 engages the lip of the crowned head 52 on plunger 12. The plunger retraction spring 53, a helical spring embracing the shank of the plunger and abutting lug 14 of bracket 13 and the underside of the lip of head 52, is compressed as the plunger is moved toward loop 16 of strip 17. It will be noted that when the plunger is released, it is prevented from being retracted completely from bracket lugs 14 by the engagement of head 52 with stem 15. The full rotation of stem 15 in a clockwise direction carries the crest of the crown of spring finger 11 beyond the crest of the crown of head 52 to establish a spring biased detent of the stem 15 in the "positive on" position. A "positive on" setting displaces bimetal strip 17 downward at its actuating end as viewed in FIG. 1. In one embodiment this displacement is sufficient to maintain the switch 24 closed to a temperature of zero Fahrenheit. At these settings, the convex surface 31 is spaced from abutment 29.

It is to be appreciated that the "positive on" control of this invention lends itself to applications other than the specific thermostat-switch combination shown and is subject to modifications as where the element secured to stem 15 directly engages an element connected to the bimetal 17. Accordingly, the disclosure is to be read as illustrative of the invention and not in a limiting sense.

I claim:

1. An adjustable thermostat comprising a base, a controlled element fixed in position with respect to said base, a thermally responsive element, a mounting supporting said thermally responsive element and secured to said base, an actuating portion of said thermally responsive element having an actuating position which actuates said controlled element, means for adjusting the position of said mounting with respect to said base operatively coupled to said mounting to move said actuating portion with respect to said base and said controlled element toward and away from said actuating position and means engaging said thermally responsive element intermediate said actuating portion and said mounting to move said actuating portion toward said actuating position in response to a given manipulation of said adjusting means.

2. A combination according to claim 1 wherein said adjusting means is a rotatable shaft.

3. A combination according to claim 2 including a screw threaded coupling between said shaft and said base maintaining the rotational axis of said shaft normal to said base, an abutment on said shaft movable normal to said base and engaging said thermally responsive element.

4. A combination according to claim 2 wherein said means engaging said thermally responsive element includes a camming element secured to said shaft for movement through an arc with the rotation of said shaft.

5. A combination according to claim 1 wherein said thermally responsive element is a bimetal strip of generally planar form having a loop standing out of the general plane of the strip intermediate said actuating portion and the region of said strip engaged by said mounting, and wherein said means engaging said strip engages the loop.

6. A combination according to claim 2 including a camming element secured to said shaft for movement through an arc with the rotation of said shaft, a pushrod, a mounting for maintaining said pushrod to be engaged at one end by said camming element at a predetermined position of said shaft and to engage at the other end said thermally responsive element and to tend to move said actuating portion thereof.

7. A combination according to claim 6 wherein said thermally responsive element is a bimetal strip of generally planar form having a loop standing out of the general plane of the strip intermediate said actuating portion and the region of said strip engaged by said mounting, and wherein said pushrod is in a plane generally parallel to the general plane of the strip and intersecting the loop of the strip whereby said other end of said pushrod is engageable with said loop.

8. A combination according to claim 6 wherein the one end of said pushrod is crowned and has a crest, and the camming element is crowned and has a crest, means resiliently biassing said pushrod toward said camming element, and a stop to limit the rotation of said shaft to position at which said pushrod and camming element crowns are engaged in a region spaced from their regions of initial contact by their crowns, whereby said shaft and cam are detented in a position to engage said rod with said strip.

9. A combination according to claim 6 wherein said thermally responsive element mounting includes a post extending from said base to a portion of said element intermediate its ends, and said pushrod mounting is mounted on said post.

10. A combination according to claim 4 wherein said camming element is a spring finger ribbon extending generally tangentially from said shaft and secured thereto.